US012746573B2

(12) United States Patent
Shen et al.

(10) Patent No.: US 12,746,573 B2
(45) Date of Patent: Sep. 29, 2026

(54) SULFONATION TREATMENT FOR A THERMOPLASTIC PART

(71) Applicant: Rohr, Inc., Chula Vista, CA (US)

(72) Inventors: Shyan Bob Shen, San Diego, CA (US); Daniel O. Ursenbach, El Cajon, CA (US); Michael van Tooren, San Diego, CA (US); Chris Croshaw, San Diego, CA (US); Jeffrey D. Woods, Beaumont, CA (US); Keith E. Ritchie, San Diego, CA (US); Kevin R. Bordage, Westfield, MA (US); Blair A. Smith, South Windsor, CT (US); Vijay V. Pujar, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 0 days.

(21) Appl. No.: 19/034,259

(22) Filed: Jan. 22, 2025

(65) Prior Publication Data

US 2025/0235892 A1 Jul. 24, 2025

Related U.S. Application Data

(60) Provisional application No. 63/623,632, filed on Jan. 22, 2024.

(51) Int. Cl.
*B05D 3/04* (2006.01)

(52) U.S. Cl.
CPC .................................. *B05D 3/0446* (2013.01)

(58) Field of Classification Search
CPC .. B05D 3/0446; B05D 3/0493; C08J 7/12–18; B29C 71/009
See application file for complete search history.

(56) References Cited

U.S. PATENT DOCUMENTS 4,775,587 A 10/1988 Walles
6,758,910 B2 7/2004 Schmoyer
2010/0136232 A1* 6/2010 Walker .................. B29C 35/049 118/667

(Continued)

FOREIGN PATENT DOCUMENTS

EP 1072635 B1 9/2005
WO 2020225052 A1 11/2020

OTHER PUBLICATIONS

EP Search Report for EP Patent Application No. 25153314.7 dated Jun. 11, 2025.

*Primary Examiner* — Alex A Rolland
(74) *Attorney, Agent, or Firm* — Getz Balich LLC

(57) ABSTRACT

A method for applying a sulfonation treatment to a thermoplastic part includes installing a gas sulfonation assembly on one or more surfaces of the thermoplastic part by forming a vacuum bag on the one or more surfaces. The vacuum bag forms a sealed cavity between the vacuum bag and a treatment portion of the one or more surfaces. The method further includes drawing a vacuum in the sealed cavity with the gas sulfonation assembly, directing a sulfonating gas into the sealed cavity with the gas sulfonation assembly to sulfonate the treatment portion, removing the sulfonating gas from the sealed cavity with the gas sulfonation assembly, removing the gas sulfonation assembly from the thermoplastic part, applying a neutralizing agent to the treatment portion, and applying at least one coating to the treatment portion.

16 Claims, 3 Drawing Sheets

(56) References Cited

U.S. PATENT DOCUMENTS

| | | | | |
|---|---|---|---|---|
| 2013/0209687 | A1 * | 8/2013 | Buehler | C08J 7/14 427/296 |
| 2013/0209689 | A1 | 8/2013 | Wojtaszek | |

* cited by examiner

SULFONATION TREATMENT FOR A THERMOPLASTIC PART

This application claims priority to U.S. Patent Appln. No. 63/623,632 filed Jan. 22, 2024, which is hereby incorporated herein by reference in its entirety.

BACKGROUND

1. Technical Field

This disclosure relates generally to thermoplastic parts for aircraft and, more particularly, to methods for applying a sulfonation treatment to a thermoplastic part.

2. Background Information

Aircraft components, such as those forming aerostructure components (e.g., panels) of a fuselage, wings, propulsion system nacelles, interior parts, and other structural components of aircraft, increasingly include thermoplastic materials (e.g., thermoplastic composite materials). While these thermoplastic materials provide substantial benefits to aircraft weight and manufacturing costs, they can be resistant to coating by paint and other coating materials. Various processes are known in the art for improving the coating characteristics of thermoplastic parts. While these known processes have various advantages, there is still room in the art for improvement.

SUMMARY

It should be understood that any or all of the features or embodiments described herein can be used or combined in any combination with each and every other feature or embodiment described herein unless expressly noted otherwise.

According to an aspect of the present disclosure, a method for applying a sulfonation treatment to a thermoplastic part includes installing a gas sulfonation assembly on one or more surfaces of the thermoplastic part by forming a vacuum bag on the one or more surfaces. The vacuum bag forms a sealed cavity between the vacuum bag and a treatment portion of the one or more surfaces. The method further includes drawing a vacuum in the sealed cavity with the gas sulfonation assembly, directing a sulfonating gas into the sealed cavity with the gas sulfonation assembly to sulfonate the treatment portion, removing the sulfonating gas from the sealed cavity with the gas sulfonation assembly, removing the gas sulfonation assembly from the thermoplastic part, applying a neutralizing agent to the treatment portion, and applying at least one coating to the treatment portion.

In any of the aspects or embodiments described above and herein, drawing the vacuum in the sealed cavity may include drawing the vacuum in the sealed cavity with a vacuum pump connected in fluid communication with the sealed cavity and removing the sulfonating gas from the sealed cavity may include removing the sulfonating gas from the sealed cavity with the vacuum pump.

In any of the aspects or embodiments described above and herein, removing the sulfonating gas from the sealed cavity with the vacuum pump may include directing the sulfonating gas through a vacuum trap between the sealed cavity and the vacuum pump.

In any of the aspects or embodiments described above and herein, directing the sulfonating gas through a vacuum trap may include condensing the sulfonating gas in the vacuum trap.

In any of the aspects or embodiments described above and herein, directing the sulfonating gas through a vacuum trap may include neutralizing the sulfonating gas in the vacuum trap.

In any of the aspects or embodiments described above and herein, the step installing the gas sulfonation assembly on the one or more surfaces may be performed with the thermoplastic part installed on an aircraft.

In any of the aspects or embodiments described above and herein, directing the sulfonating gas into the sealed cavity with the gas sulfonation assembly to sulfonate the treatment portion may include applying the sulfonating gas to the treatment portion for a duration to increase a sulfur content of the thermoplastic part at the treatment portion to have an infrared spectrum detectable amount of a sulfone group (O═S═O) with a peak wavenumber between 1,000 $cm^{-1}$ and 1,098 $cm^{-1}$.

In any of the aspects or embodiments described above and herein, directing the sulfonating gas into the sealed cavity with the gas sulfonation assembly to sulfonate the treatment portion may include applying the sulfonating gas to the treatment portion for a duration to increase the sulfur content of the thermoplastic part at the treatment portion to have the infrared spectrum detectable amount of the sulfone group (O═S═O) with the peak wavenumber between 1,025 $cm^{-1}$ and 1,050 $cm^{-1}$.

In any of the aspects or embodiments described above and herein, forming the vacuum bag on the one or more surfaces may include adhering a barrier film to the one or more surfaces with a sealant tape to form the sealed cavity.

In any of the aspects or embodiments described above and herein, the barrier film may be connected to a vacuum pump and a sulfonating gas source of the gas sulfonation assembly by a conduit connecting the vacuum pump and the sulfonating gas source in fluid communication with the sealed cavity.

In any of the aspects or embodiments described above and herein, the thermoplastic part may include a polyether ether ketone (PEEK), a poly ether ketone ketone (PEKK), or a poly aryl ether ketone (PAEK) thermoplastic matrix material.

According to another aspect of the present disclosure, an assembly for sulfonating a thermoplastic part includes a vacuum bag, a vacuum pump, a sulfonating gas source, and a three-way connector. The vacuum bag is disposed on one or more surfaces of the thermoplastic part. The vacuum bag surrounds and forms a sealed cavity between the one or more surfaces and the vacuum bag. The sealed cavity is disposed at a treatment portion of the one or more surfaces. The three-way connector selectively connects the vacuum pump and the sulfonating gas source in fluid communication with the sealed cavity by: (1) in a first configuration of the three-way connector, directing a gas within the sealed cavity to the vacuum pump; and (2) in a second configuration of the three-way connector, directing a sulfonating gas from the sulfonating gas source to the sealed cavity to sulfonate the treatment portion.

In any of the aspects or embodiments described above and herein, the vacuum bag may include a barrier film adhered to the one or more surfaces with a sealant tape to form the sealed cavity.

In any of the aspects or embodiments described above and herein, the barrier film may be a polyimide film.

In any of the aspects or embodiments described above and herein, the assembly may further include a vacuum trap connected in fluid communication between the three-way connector and the vacuum pump.

According to another aspect of the present disclosure, a method for applying a sulfonation treatment to a thermoplastic part includes installing a gas sulfonation assembly on one or more surfaces of the thermoplastic part by forming a vacuum bag on the one or more surfaces. The vacuum bag forms a sealed cavity between the vacuum bag and a treatment portion of the one or more surfaces. The method further includes drawing a vacuum in the sealed cavity with a vacuum pump of the gas sulfonation assembly and directing a sulfonating gas into the sealed cavity with a sulfonating gas source of the gas sulfonation assembly to sulfonate the treatment portion. The sulfonating gas includes sulfur trioxide, sulfur dioxide, or a combination of sulfur trioxide and sulfur dioxide. The method further includes removing the sulfonating gas from the sealed cavity with the vacuum pump and condensing or neutralizing the sulfonating gas with a vacuum trap of the gas sulfonation assembly as the sulfonating gas is removed from the sealed cavity by the vacuum pump.

In any of the aspects or embodiments described above and herein, the sulfonating gas may include between 0.05 percent and 2 percent sulfur trioxide ($SO_3$), sulfur dioxide ($SO_2$), or a combination of sulfur trioxide ($SO_3$) and sulfur dioxide ($SO_2$), by volume, in 95 percent to 99.5 percent nitrogen, by volume.

In any of the aspects or embodiments described above and herein, directing the sulfonating gas into the sealed cavity with the gas sulfonation assembly to sulfonate the treatment portion may include applying the sulfonating gas to the treatment portion for a duration to increase a sulfur content of the thermoplastic part at the treatment portion to have an infrared spectrum detectable amount of a sulfone group (O═S═O) with a peak wavenumber between 1,000 $cm^{-1}$ and 1,098 $cm^{-1}$.

In any of the aspects or embodiments described above and herein, directing the sulfonating gas into the sealed cavity with the gas sulfonation assembly to sulfonate the treatment portion may include applying the sulfonating gas to the treatment portion for the duration to increase the sulfur content of the thermoplastic part at the treatment portion to have the infrared spectrum detectable amount of the sulfone group (O═S═O) with the peak wavenumber between 1,025 $cm^{-1}$ and 1,050 $cm^{-1}$.

In any of the aspects or embodiments described above and herein, directing the sulfonating gas into the sealed cavity may include exposing the treatment portion to the sulfonating gas for a duration between 20 seconds and 60 minutes.

The present disclosure, and all its aspects, embodiments and advantages associated therewith will become more readily apparent in view of the detailed description provided below, including the accompanying drawings.

DETAILED DESCRIPTION

Figure 1:
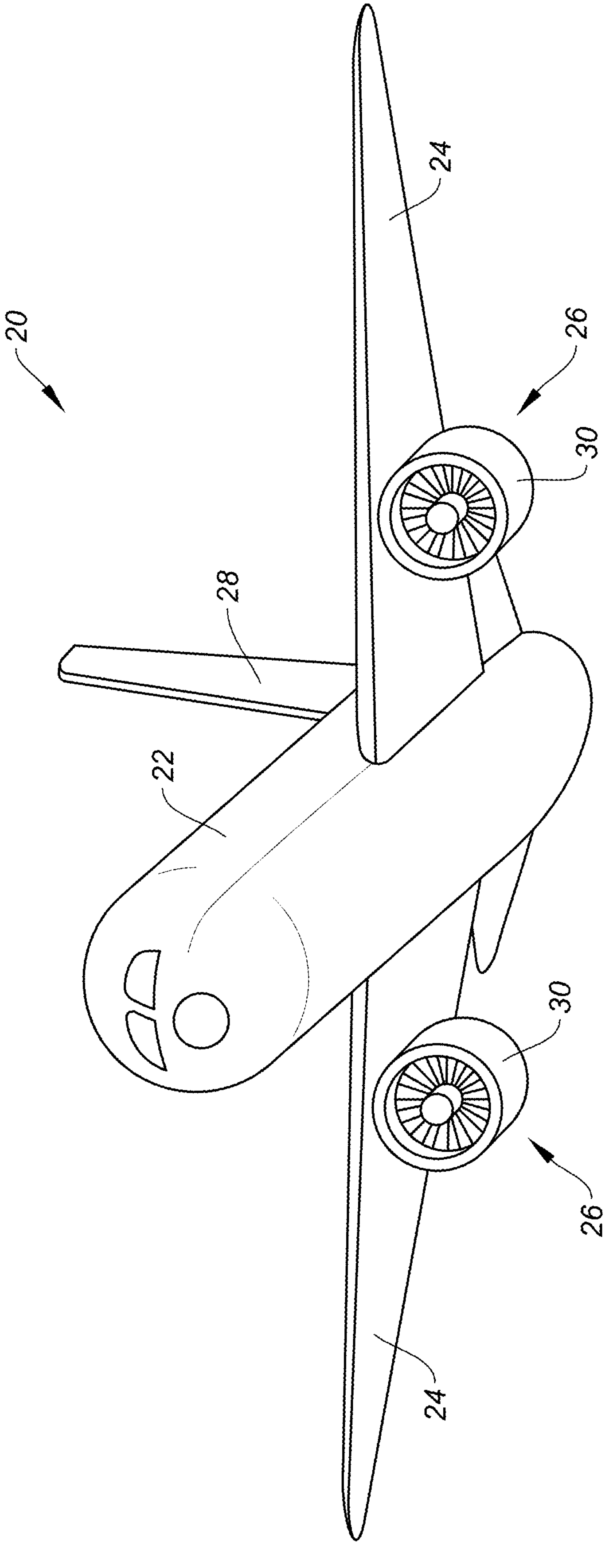
FIG. 1 illustrates a perspective view of an aircraft, in accordance with one or more embodiments of the present disclosure.

FIG. 1 illustrates an aircraft 20 such as an airplane (e.g., a fixed-wing aircraft). The aircraft 20 of FIG. 1 includes a fuselage 22, wings 24, propulsion systems 26, and a tail assembly 28. The wings 24 extend outward from the fuselage 22. Each of the propulsion systems 26 is mounted on a respective one of the wings 24. The tail assembly 28 is disposed at an aft end of the fuselage 22. The present disclosure, however, is not limited to the foregoing exemplary aircraft 20 configuration, and the aircraft 20 may alternatively be a rotary-wing aircraft (e.g., a helicopter), a tilt-rotor aircraft, a tilt-wing aircraft, a propeller-driven aircraft, or another aerial vehicle. Moreover, the aircraft 20 may be a manned aerial vehicle or an unmanned aerial vehicle (UAV, e.g., a drone, a satellite, etc.)

The propulsion systems 26 of FIG. 1 are configured as a turbofan gas turbine engine propulsion system. However, it should be understood that aspects of the present disclosure may be equally applicable to other configurations of propulsion system or gas turbine engine configurations. Each of the propulsion systems 26 of FIG. 1 includes a nacelle 30 configured to house and provide an exterior aerodynamic cover for the respective one of the propulsion systems 26.

Aircraft parts, such as those forming all or portions of the fuselage 22, the wings 24, the tail assembly 28, the nacelle 30, or other aerostructures of the aircraft 20 may be selected to provide suitable structural strength, rigidity, and impact resistance while also minimizing weight. Other examples of aircraft parts may include ducts, water collectors, brake rods, electronic boxes, heat sinks, piping, interior structures (e.g., lavatory surfaces, galley surfaces, tray tables, seat frames, etc.), electrical connector components, and the like. Thermoplastic materials (e.g., thermoplastic composite materials) may be used for aircraft parts, such as those described above, in order to reduce aircraft weight and manufacturing costs, for example, in comparison to conventional metal (e.g., aluminum) and thermoset materials. However, thermoplastic parts tend to exhibit low surface energy, thereby contribution to poor adhesion of paint, metal plating, lightning strike protection layers, bonding agents (e.g., adhesives), and other coatings (hereinafter collectively "TP coatings") to surfaces of the thermoplastic parts. These poor adhesion characteristics of thermoplastic parts can, in some cases, degrade the effectiveness of lightning strike protection layers, accelerate cracking and/or peeling of paint or other surface coatings, and/or prevent suitable bonding between thermoplastic components.

Figure 2:
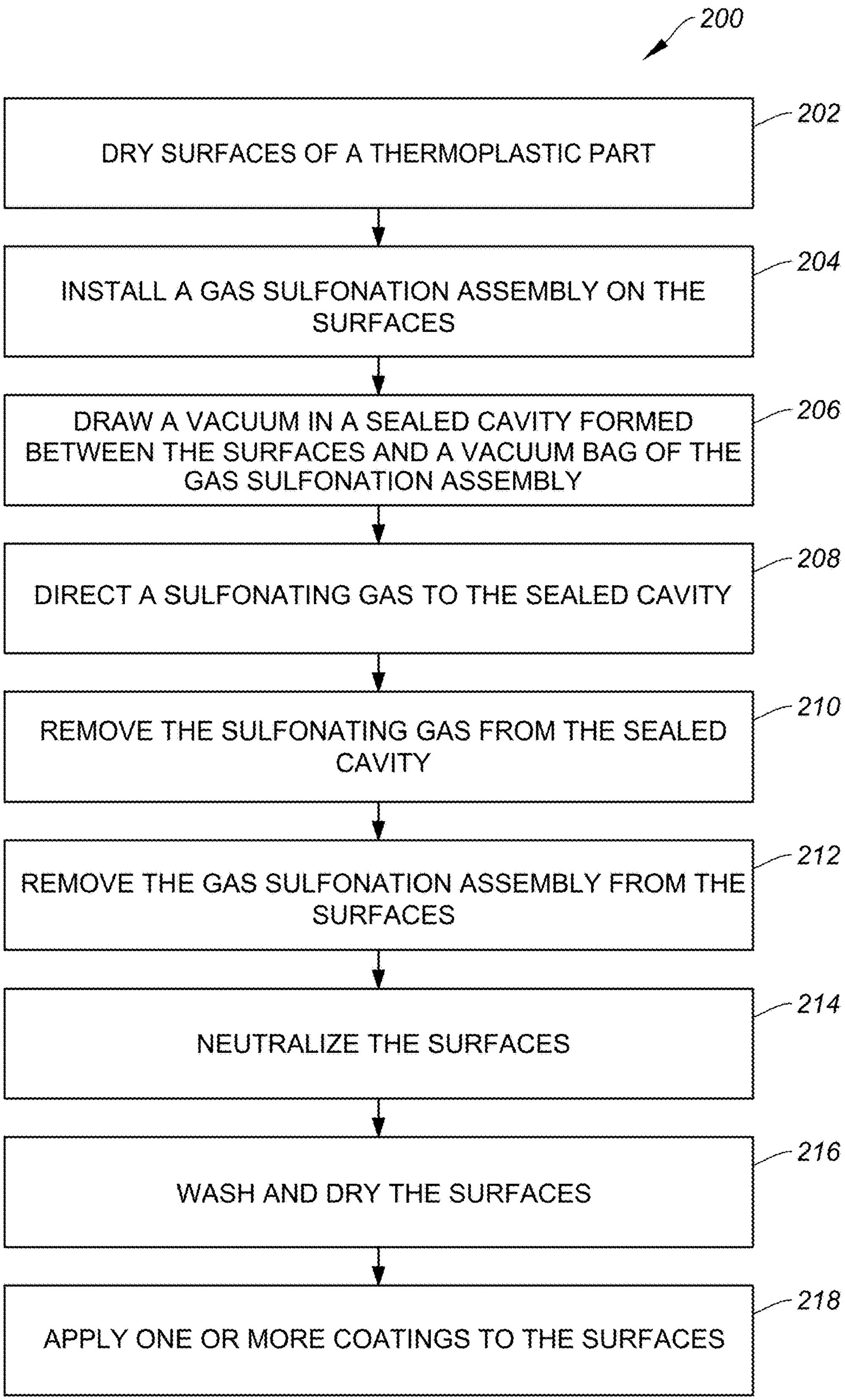
FIG. 2 illustrates a flow chart depicting a method for applying a sulfonation treatment to a thermoplastic part, in accordance with one or more embodiments of the present disclosure.

Referring to FIG. 2, a Method 200 for applying a sulfonation treatment to a thermoplastic part is provided. FIG. 2 illustrates a flowchart for the Method 200. Unless otherwise noted herein, it should be understood that the steps of Method 200 are not required to be performed in the specific sequence in which they are discussed below and, in some embodiments, the steps of Method 200 may be performed separately or simultaneously. Further, it should be understood that not all of the steps of the Method 200, discussed below, may be required unless otherwise described herein.

Figure 3:
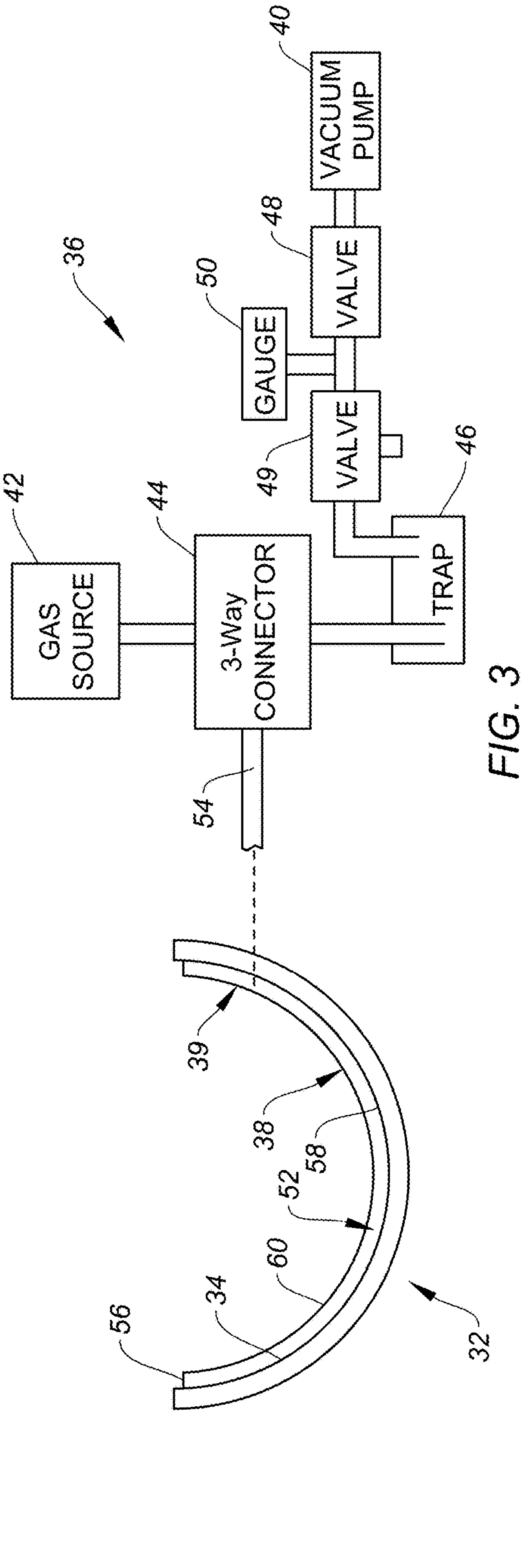
FIG. 3 schematically illustrates a gas sulfonation assembly connected to a thermoplastic part, in accordance with one or more embodiments of the present disclosure.
Figure 4:
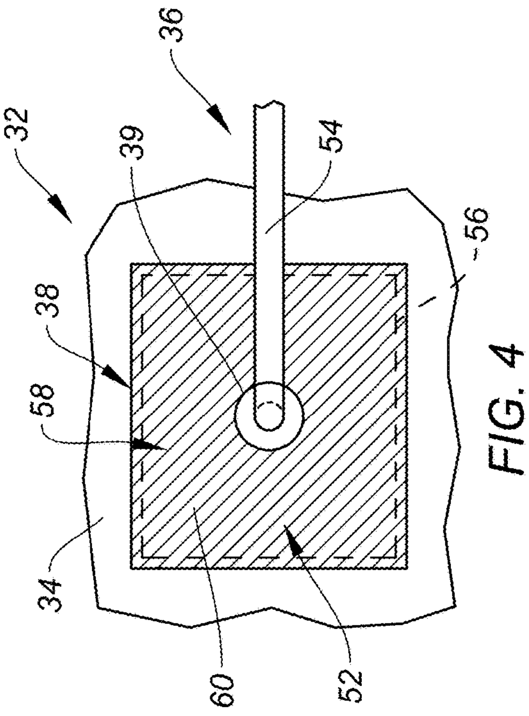
FIG. 4 schematically illustrates the gas sulfonation assembly installed on surfaces of the thermoplastic part, in accordance with one or more embodiments of the present disclosure.

FIGS. 3 and 4 illustrate a portion of a thermoplastic part 32 (e.g., a thermoplastic composite part) which may be treated in accordance with the Method 200 of the present disclosure. The thermoplastic part 32 is configured as a panel (e.g., a curved panel) which may form an exterior surface or skin for a portion of the fuselage 22, the wings 24, the tail assembly 28, the nacelle 30, or another thermoplastic part of the aircraft 20 (see FIG. 1). Alternatively, the thermoplastic part 32 may be a discrete component independent of the aircraft 1000, and the thermoplastic part 32 may subsequently be installed on the aircraft 20 or the propulsion system 26 (e.g., the nacelle 30). While the Method 200 will be described herein with respect to the thermoplastic part 32, it should be understood that the present disclosure is not limited to the application of sulfonation treatments for the foregoing exemplary thermoplastic part 32. For example, the aspects of the present disclosure Method 200 may also be applicable for sulfonation treatment of aerostructure panels and other parts which do not include a thermoplastic material (e.g., metal, thermoset, and other aerostructure component materials) to improve surface bonding characteristics.

Thermoplastic parts, such as the thermoplastic part 32, may include a thermoplastic matrix material and a composite reinforcement material. Examples of the thermoplastic matrix material include polyamide (PA), polyamide-imide (PAI), polyarylsulfone (PAS), polyethersulfone (PES), polyoxymethylene (POM), polyphenylene sulfide (PPS), polyether ether ketone (PEEK), polyetherimide (PEI), polyphthalamide (PPA), poly ether ketone ketone (PEKK), or poly aryl ether ketone (PAEK), or the like, or any combination thereof. Examples of the composite reinforcement material include glass fibers, carbon fibers, aramid fibers, basalt fibers, mineral fibers, fibers from renewable raw materials, metal fibers, or polymer fibers, or the like, or any combination thereof. The present disclosure is not limited to the foregoing exemplary thermoplastic material materials and composite reinforcement materials. Thermoplastic parts very often include a plurality of composite reinforcement layers. The reinforcement fibers in each layer may have a fiber direction (e.g., all fibers in a layer may be oriented in the same direction). In some instances, a thermoplastic part including a plurality of composite reinforcement layers will have different fiber layers with different fiber directions. For example, a first layer may have fibers oriented in a first direction and a second layer may have fibers oriented in a second direction that is perpendicular to the first direction, or at opposing forty-five degree angles, or at opposing thirty degree angles, and the like.

Step 202 includes, optionally, drying one or more surfaces 34 of the thermoplastic part 32. For example, if the relative humidity at (e.g., on, adjacent, or proximate) the thermoplastic part 32 is greater than 50 percent, the surfaces 34 may be dried to prevent or minimize interaction between water moisture on the surfaces 34 and a sulfonating gas. The surfaces 34 may be dried, for example, by exposing the thermoplastic part 32 to an elevated temperature (e.g., greater than 80° C.) for at least 40 minutes.

Step 204 includes installing an out-of-chamber gas sulfonation assembly 36 on the surfaces 34 of the thermoplastic part 32. FIGS. 3 and 4 illustrate the gas sulfonation assembly 36 installed on a curved surface 34 of the thermoplastic part 32.

The gas sulfonation assembly 36 of FIG. 3 includes a vacuum bag 38, a vacuum port 39, a vacuum pump 40, a sulfonating gas source 42, and a three-way connector 44. The gas sulfonation assembly 36 may additionally include a vacuum trap 46, a vacuum pump isolation valve 48, a vented throttle valve 49, and/or a pressure gauge 50. The vacuum bag 38 is disposed on the one or more surfaces 34 of the thermoplastic part 32. The vacuum bag 38 forms a sealed cavity 52 between the surfaces 34 and the vacuum bag 38. The vacuum pump 40 is configured to draw air and other gases from the sealed cavity 52 to establish a vacuum in the sealed cavity 52. The sulfonating gas source 42 is configured to store a sulfonating gas and/or direct the sulfonating gas into the sealed cavity 52. For example, the sulfonating gas source 42 may include a sulfonating gas tank storing the sulfonating gas. The sulfonating gas source 42 may additionally or alternatively include a pump configured to direct (e.g., pump) the sulfonating gas into the sealed cavity 52. The vacuum pump 40 and the sulfonating gas source 42 are selectively connected in fluid communication with the sealed cavity 52 by the three-way connector 44. The three-way connector 44 may include one or more valves configured to facilitate selective fluid connection of the vacuum pump 40 with the sealed cavity 52 while isolating the sulfonating gas source 42 from the sealed cavity 52 or selective fluid connection of the sulfonating gas source 42 with the sealed cavity 52 while isolating the vacuum pump 40 from the sealed cavity 52. The three-way connector 44 is connected to the vacuum bag 38 by a conduit 54 (e.g., a tube, a pipe, a hose, or another suitable fluid conduit) and the vacuum port 39. The vacuum port 39 is installed on the vacuum bag 38 in fluid communication with the sealed cavity 52. The conduit 54 extends connects the three-way connector 44 to the vacuum port 39 to form a fluid connection between the three-way connector 44 and the sealed cavity 52. The vacuum trap 46 may be connected in fluid communication between the three-way connector 44 and the vacuum pump, for example, to recycle the sulfonating gas or to prevent contamination of the vacuum pump 40 and/or the surrounding atmosphere with the sulfonating gas. The vacuum pump isolation valve 48 may be connected between the vacuum pump 40 and the vacuum trap 46 to facilitate selective fluid connection or isolation of the vacuum pump 40 from upstream components (e.g., the vacuum trap 46 and the three-way connector 44). The vented throttle valve 49 may be connected, for example, between the vacuum trap 46 and the isolation valve 48 (or between the vacuum trap 46 and the pressure gauge 50) to facilitate controlled removal of the sulfonating gas from the sealed cavity 52 (e.g., through the vacuum trap 46) and/or to establish atmospheric pressure conditions within the sealed cavity 52 and portions of the gas sulfonation assembly 36.

Installing the gas sulfonation assembly 36 on the thermoplastic part 32 includes forming the vacuum bag 38 on the surfaces 34. The vacuum bag 38 may be formed, for example, by applying a sealant tape 56 onto the surfaces 34 surrounding (e.g., circumscribing) a treatment portion 58 of the thermoplastic part 32 (e.g., the surfaces 34) to be sulfonated using the sulfonating gas, such that the sealant tape 56 forms a periphery of the treatment portion 42 and the sealed cavity 52. The sealant tape 56 may include an elastomer (e.g., synthetic rubber) being resistant to sulfuric acid ($H_2SO_4$). For example, the sealant tape 56 may be a high-temperature composite vacuum-bag sealant tape such as, but not limited to, GS® A-800-3G sealant sold by General Sealants, Inc. (City of Industry, CA). The vacuum bag 38 may be further formed, for example, by applying a barrier film 60 onto the sealant tape 56, or otherwise attaching the barrier film 60 to the surfaces 34 with the sealant tape 56, to form the sealed cavity 52 and isolate (e.g., seal) the treatment portion 58 and the sealed cavity 52 from the surrounding environment with the sealant tape 56 and the barrier film 60. The barrier film 60 may be a polyimide film such as that sold under the KAPTON trademark (DuPont Electronics, Inc. of Boston, MA). The barrier film 60 may alternatively be a polytetrafluoroethylene (PTFE) film or another suitable sulfuric-acid-resistant material film including polymer films free of per- and polyfluoroalkyl substances (PFAS). The barrier film 60 may be connected in fluid communication with the three-way connector 44 by the conduit 54 to form a fluid connection between the three-way connector 44 and the sealed cavity 52.

Step 206 includes drawing a vacuum in the sealed cavity 52 with the gas sulfonation assembly 36. The vacuum pump 40 is connected in fluid communication with the sealed cavity 52 by the three-way connector 44. The vacuum pump 40 is energized to draw air from the sealed cavity 52. The vacuum pump 40 may draw air from the sealed cavity 52 to establish a vacuum in the sealed cavity 52 of at least 50 millimeters of mercury (mmHg) as determined, for example, using the pressure gauge 50. Once the desired vacuum has been established in the sealed cavity 52, the vacuum pump isolation valve 48 may be shut and the vacuum pump 40 may be deenergized.

Step 208 includes directing the sulfonating gas into the sealed cavity 52 with the gas sulfonation assembly 36. The sulfonating gas source 42 is connected in fluid communication with the sealed cavity 52 by the three-way connector 44. The sulfonating gas is directed into the sealed cavity 52 from the sulfonating gas source 42, thereby exposing the treatment portion 58 of the surfaces 34 to the sulfonating gas. The sulfonating gas includes sulfur trioxide ($SO_3$), sulfur dioxide ($SO_2$), or a combination of sulfur trioxide ($SO_3$) and sulfur dioxide ($SO_2$). The sulfonating gas additionally includes a gas which is non-reactive with the sulfur trioxide ($SO_3$) and/or the sulfur dioxide ($SO_2$) such as, but not limited to, air or nitrogen. For example, the sulfonating gas may include between approximately 0.05 percent and approximately 2 percent sulfur trioxide ($SO_3$), sulfur dioxide ($SO_2$), or a combination of sulfur trioxide ($SO_3$) and sulfur dioxide ($SO_2$), by volume, in approximately 95 percent to approximately 99.5 percent nitrogen, by volume. A duration for which treatment portion 58 is exposed to the sulfonating gas within the sealed cavity 52 may be between approximately 20 seconds and approximately 60 minutes.

Application of the sulfonating gas to the thermoplastic part 32 (e.g., the treatment portion 58) introduces the sulfone group (O═S═O) into the polymer chains of the thermoplastic part 32 (e.g., the thermoplastic matrix material) at (e.g., on, adjacent, or proximate) the surfaces 34, thereby changing the properties (e.g., a higher surface energy and a lower static contact angle) of the thermoplastic part 32 at (e.g., on, adjacent, or proximate) the treatment portion 58 of the surfaces 34. The sulfonated thermoplastic part 32 may have a sulfur content with an infrared spectrum detectable amount of the sulfone group (O═S═O) with a peak wavenumber in the region between approximately 1,000 $cm^{-1}$ and approximately 1,098 $cm^{-1}$ and, more preferably, between approximately 1,025 $cm^{-1}$ and approximately 1,050 $cm^{-1}$ with a peak intensity higher than approximately 0.002 absorbance (or higher than approximately 0.2 percent reflectance) using, for example, an attenuated total reflectance (ATR) technique at (e.g., on, adjacent, or proximate) the treatment portion 58 of the surfaces 34. Of course, a suitable sulfone group content of the thermoplastic part 32 at (e.g., on, adjacent, or proximate) the treatment portion 58 of the surfaces 34 will depend on a number of factors such as, but not limited to, the particular thermoplastic matrix material of the thermoplastic part 32, a surface roughness of the surfaces 34, and a material of a coating to be subsequently applied to the surfaces 34.

Step 210 includes removing the sulfonating gas from the sealed cavity 52 with the gas sulfonation assembly 36. The vacuum pump 40 is again connected in fluid communication with the sealed cavity 52 by the three-way connector 44. The vacuum pump 40 is energized to draw the sulfonating gas from the sealed cavity 52. The vacuum pump 40 may draw the sulfonating gas from the sealed cavity 52 to establish a vacuum in the sealed cavity 52 of at least 50 millimeters of mercury (mmHg) as determined, for example, using the pressure gauge 50. Once the desired vacuum has been established in the sealed cavity 52, the vacuum pump isolation valve 48 may be shut and the vacuum pump 40 may be deenergized. The sulfonating gas may be drawn through the vacuum trap 46, for example, to prevent contamination of the vacuum pump 40 and/or the surrounding atmosphere with the sulfonating gas. If the sulfonating gas will be reused for subsequent sulfonating gas treatments, the vacuum trap 46 (e.g., a "cold trap") may be cooled to facilitate condensation of the sulfonating gas within the vacuum trap 46. For example, ice, dry ice, or another suitable cooling medium or cooling assembly may be disposed within or surrounding the vacuum trap to facilitate condensation of the sulfonating gas within the vacuum trap 46. If the sulfonating gas will not be reused for subsequent sulfonating gas treatments, the vacuum trap 46 may include a neutralizing fluid. The sulfonating gas may be directed into and through the neutralizing fluid within the vacuum trap 46. The neutralizing fluid may include, for example, an aqueous solution of a neutralizing agent (e.g., a buffering agent) such as, but not limited to, sodium hydroxide (NaOH), potassium hydroxide (KOH), calcium carbonate ($CaCO_3$), magnesium oxide (MgO), sodium carbonate ($Na_2CO_3$), sodium bicarbonate ($NaHCO_3$), or calcium hydroxide ($Ca(OH)_2$), amines, or another suitable base.

Step 212 includes removing the gas sulfonation assembly 36 from the thermoplastic part 32. For example, the vacuum bag 38 may be removed from the surfaces 34 by removing the sealant tape 56.

Step 214 includes neutralizing the treatment portion 42 with a neutralizing fluid, to remove excess acid from the surfaces 34 (e.g., the treatment portion 58) and to stabilize the modified thermoplastic matrix material, for example, with a pH value approximately between 7 and 9. The neutralizing fluid may include, for example, an aqueous solution of a neutralizing agent (e.g., a buffering agent) such as, but not limited to, sodium hydroxide (NaOH), potassium hydroxide (KOH), calcium carbonate ($CaCO_3$), magnesium oxide (MgO), sodium carbonate ($Na_2CO_3$), sodium bicarbonate ($NaHCO_3$), or calcium hydroxide ($Ca(OH)_2$), amines, or another suitable base.

Step 216 includes, optionally, washing (e.g., with water) the surfaces 34 (e.g., the treatment portion 58), to remove any remaining impurities or residues from the sulfonation process, and drying the surfaces 34 to remove excess moisture. Step 218 includes applying at least one coating (e.g., primer, topcoat, paint, metal plating, lightning strike protection layers, bonding agents, and/or other coatings) to the surfaces 34 (e.g., the treatment portion 58). The present disclosure is not limited to any particular coating or coating process.

The sulfonation treatment of the present disclosure facilitates treatment of large aircraft thermoplastic parts and/or aircraft thermoplastic parts having complex three-dimensional curvatures, without the need for a sulfonation tank or chamber. Accordingly, the present disclosure sulfonation treatment may be performed during thermoplastic part manufacture as well as in the field for repair, repainting, or the like, without the need for large, expensive, or complex gas sulfonation equipment. Moreover, the sulfonation treatment of the present disclosure may be applied to thermoplastic parts of the aircraft without requiring removal from the aircraft or its propulsion systems. The sulfonation treatment of the present disclosure facilitates improved surface energy and wettability characteristics of the treated thermoplastic parts, thereby improving the adhesion of paint, metal plating, lightning strike protection layers, bonding agents, and/or other coatings. For example, the sulfonation treatment of the present disclosure may reduce the static contact angle of treated surfaces of thermoplastic parts to 30 degrees or less.

The sulfonation treatment of the present disclosure may be applied on the thermoplastic parts with thermoplastic matrix material including polyamide (PA), polyamide-imide (PAI), polyarylsulfone (PAS), polyethersulfone (PES), polyoxymethylene (POM), polyphenylene sulfide (PPS), polyether ether ketone (PEEK), polyetherimide (PEI), polyphthalamide (PPA), poly ether ketone ketone (PEKK), or poly aryl ether ketone (PAEK), or the like, or any combination thereof. However, some thermoplastic matrix materials have higher resistance to sulfonation and may need longer treatment time and/or higher treatment temperatures such as, for example, polyphenylene sulfide (PPS) and polyetherimide (PEI).

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

What is claimed is:

1. A method for applying a sulfonation treatment to a thermoplastic part, the method comprising:

installing a gas sulfonation assembly on one or more surfaces of the thermoplastic part by forming a vacuum bag on the one or more surfaces, and the vacuum bag forms a sealed cavity between the vacuum bag and a treatment portion of the one or more surfaces;

drawing a vacuum in the sealed cavity with the gas sulfonation assembly;

directing a sulfonating gas into the sealed cavity with the gas sulfonation assembly to sulfonate the treatment portion;

removing the sulfonating gas from the sealed cavity with the gas sulfonation assembly;

removing the gas sulfonation assembly from the thermoplastic part;

applying a neutralizing agent to the treatment portion; and applying at least one coating to the treatment portion.

2. The method of claim 1, wherein:

drawing the vacuum in the sealed cavity includes drawing the vacuum in the sealed cavity with a vacuum pump connected in fluid communication with the sealed cavity; and removing the sulfonating gas from the sealed cavity includes removing the sulfonating gas from the sealed cavity with the vacuum pump.

3. The method of claim 2, wherein removing the sulfonating gas from the sealed cavity with the vacuum pump includes directing the sulfonating gas through a vacuum trap between the sealed cavity and the vacuum pump.

4. The method of claim 3, wherein directing the sulfonating gas through a vacuum trap includes condensing the sulfonating gas in the vacuum trap.

5. The method of claim 3, wherein directing the sulfonating gas through a vacuum trap includes neutralizing the sulfonating gas in the vacuum trap.

6. The method of claim 1, wherein the step installing the gas sulfonation assembly on the one or more surfaces is performed with the thermoplastic part installed on an aircraft.

7. The method of claim 1, wherein directing the sulfonating gas into the sealed cavity with the gas sulfonation assembly to sulfonate the treatment portion includes applying the sulfonating gas to the treatment portion for a duration to increase a sulfur content of the thermoplastic part at the treatment portion to have an infrared spectrum detectable amount of a sulfone group (O═S═O) with a peak wavenumber between 1,000 $cm^{-1}$ and 1,098 $cm^{-1}$.

8. The method of claim 7, wherein directing the sulfonating gas into the sealed cavity with the gas sulfonation assembly to sulfonate the treatment portion includes applying the sulfonating gas to the treatment portion for the duration to increase the sulfur content of the thermoplastic part at the treatment portion to have the infrared spectrum detectable amount of the sulfone group (O═S═O) with the peak wavenumber between 1,025 $cm^{-1}$ and 1,050 $cm^{-1}$.

9. The method of claim 1, wherein forming the vacuum bag on the one or more surfaces includes adhering a barrier film to the one or more surfaces with a sealant tape to form the sealed cavity.

10. The method of claim 9, wherein the barrier film is connected to a vacuum pump and a sulfonating gas source of the gas sulfonation assembly by a conduit connecting the vacuum pump and the sulfonating gas source in fluid communication with the sealed cavity.

11. The method of claim 1, wherein the thermoplastic part includes a polyether ether ketone (PEEK), a poly ether ketone ketone (PEKK), or a poly aryl ether ketone (PAEK) thermoplastic matrix material.

12. A method for applying a sulfonation treatment to a thermoplastic part, the method comprising:

installing a gas sulfonation assembly on one or more surfaces of the thermoplastic part by forming a vacuum bag on the one or more surfaces, and the vacuum bag forms a sealed cavity between the vacuum bag and a treatment portion of the one or more surfaces;

drawing a vacuum in the sealed cavity with a vacuum pump of the gas sulfonation assembly;

directing a sulfonating gas into the sealed cavity with a sulfonating gas source of the gas sulfonation assembly to sulfonate the treatment portion, and the sulfonating gas includes sulfur trioxide, sulfur dioxide, or a combination of sulfur trioxide and sulfur dioxide;

removing the sulfonating gas from the sealed cavity with the vacuum pump; and condensing or neutralizing the sulfonating gas with a vacuum trap of the gas sulfonation assembly as the sulfonating gas is removed from the sealed cavity by the vacuum pump.

13. The method of claim 12, wherein the sulfonating gas includes between 0.05 percent and 2 percent sulfur trioxide ($SO_3$), sulfur dioxide ($SO_2$), or a combination of sulfur trioxide ($SO_3$) and sulfur dioxide ($SO_2$), by volume, in 95 percent to 99.5 percent nitrogen, by volume.

14. The method of claim 12, wherein directing the sulfonating gas into the sealed cavity with the gas sulfonation assembly to sulfonate the treatment portion includes applying the sulfonating gas to the treatment portion for a duration to increase a sulfur content of the thermoplastic part at the treatment portion to have an infrared spectrum detectable amount of a sulfone group (O═S═O) with a peak wavenumber between 1,000 $cm^{-1}$ and 1,098 $cm^{-1}$.

15. The method of claim 14, wherein directing the sulfonating gas into the sealed cavity with the gas sulfonation assembly to sulfonate the treatment portion includes applying the sulfonating gas to the treatment portion for the duration to increase the sulfur content of the thermoplastic part at the treatment portion to have the infrared spectrum detectable amount of the sulfone group (O═S═O) with the peak wavenumber between 1,025 $cm^{-1}$ and 1,050 $cm^{-1}$.

16. The method of claim 12, wherein directing the sulfonating gas into the sealed cavity includes exposing the treatment portion to the sulfonating gas for a duration between 20 seconds and 60 minutes.

* * * * *